United States Patent
Wheeler

(10) Patent No.: US 10,081,762 B2
(45) Date of Patent: Sep. 25, 2018

(54) WELL TREATMENT METHODS AND FLUIDS CONTAINING SYNTHETIC POLYMER

(71) Applicant: BAKER HUGHES INCORPORATED, Houston, TX (US)

(72) Inventor: Richard S. Wheeler, Crosby, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 342 days.

(21) Appl. No.: 14/029,193

(22) Filed: Sep. 17, 2013

(65) Prior Publication Data

US 2015/0075795 A1    Mar. 19, 2015

(51) Int. Cl.
  *E21B 43/25* (2006.01)
  *C09K 8/68* (2006.01)

(52) U.S. Cl.
  CPC .............. *C09K 8/685* (2013.01); *E21B 43/25* (2013.01)

(58) Field of Classification Search
  CPC . C09K 8/685; C09K 8/68; C09K 8/80; C09K 2208/08; C09K 2208/28; C09K 8/703; C09K 8/805; C09K 8/88; C09K 8/882; E21B 43/26
  See application file for complete search history.

(56) References Cited

U.S. PATENT DOCUMENTS

| | | |
|---|---|---|
| 8,066,073 B2 | 11/2011 | Abad et al. |
| 8,082,994 B2 | 12/2011 | Bryant et al. |
| 2004/0209780 A1 | 10/2004 | Harris et al. |
| 2006/0272816 A1 | 12/2006 | Frenier et al. |
| 2008/0183451 A1 | 1/2008 | Weng et al. |
| 2008/0135247 A1 | 6/2008 | Hutchins |
| 2009/0247430 A1 | 10/2009 | Fu |
| 2010/0122815 A1 | 5/2010 | Zamora et al. |
| 2010/0184630 A1 | 7/2010 | Sullivan et al. |
| 2011/0005753 A1 | 1/2011 | McMechan et al. |
| 2012/0125618 A1 | 5/2012 | Willberg et al. |
| 2012/0125639 A1 | 5/2012 | Casey et al. |
| 2012/0214714 A1 | 8/2012 | Whitwell et al. |
| 2012/0273197 A1 | 11/2012 | Gupta et al. |
| 2012/0279727 A1* | 11/2012 | Kakadjian ............ C09K 8/5083 166/386 |
| 2013/0005616 A1* | 1/2013 | Gaillard ................ C09K 8/588 507/225 |
| 2013/0025867 A1 | 1/2013 | Sun et al. |
| 2013/0056213 A1 | 3/2013 | Medvedev et al. |
| 2014/0228258 A1* | 8/2014 | Mahoney ............... C09K 8/805 507/219 |
| 2014/0309148 A1* | 10/2014 | Parris ..................... C07F 7/006 507/217 |
| 2014/0352969 A1* | 12/2014 | Chung .................... C09K 8/12 166/308.3 |
| 2014/0367108 A1* | 12/2014 | Chung .................... C09K 8/74 166/307 |
| 2015/0013984 A1* | 1/2015 | Abivin ................... E21B 43/25 166/300 |
| 2015/0027702 A1* | 1/2015 | Godoy-Vargas ........ C09K 8/90 166/279 |

OTHER PUBLICATIONS

Malhotra et al. "Proppant Placement using Alternate-Slug Fracturing" SPE 163851 Feb. 6, 2013.*
Audibert et al. "Thermal stability of sulfonated polymers" SPE 28953 pp. 81-91 (1995).*
N. Gaillard, et al.; SPE 164072; SPE International; Novel Associative Acrylamide-based for Proppant Transport in Hydraulic Fracturing Fluids Polymers.
Enhanced Oil Recovery—Oil Division; Mar. 2, 2012; http://web.archive.org/web/20120302215501/http://www.snf-oil.com/Function.html.
A. Thomas, et al.; Some Key Features to Consider When Studying Acrylamide-Based Polymers for Chemical Enhanced Oil Recovery; Oil & Gas Science and Technology, Jan. 2013.

* cited by examiner

*Primary Examiner* — William D Hutton, Jr.
*Assistant Examiner* — Charles R Nold
(74) *Attorney, Agent, or Firm* — Parsons Behle & Latimer

(57) ABSTRACT

A well treatment fluid uses ingredients that include an aqueous base, a non-associative, ionic, synthetic polymer, and optionally, at least one metal crosslinker. The polymer contains a backbone and a functional group that hinders hydrolysis of the backbone. The functional group is distributed at intervals on the backbone. A well treatment method includes forming a well treatment fluid by combining ingredients including a non-associative, ionic, synthetic polymer and a first aqueous base. The first fluid exhibits a first viscosity greater than a viscosity of the first aqueous base. The method includes treating a well during a stage using the first fluid exhibiting the first viscosity. A second well treatment fluid is formed by combining ingredients including the polymer, a second aqueous base, and at least one crosslinker and by crosslinking the synthetic polymer. The method includes treating the well during another stage using the second fluid exhibiting the second viscosity.

20 Claims, No Drawings

WELL TREATMENT METHODS AND FLUIDS CONTAINING SYNTHETIC POLYMER

TECHNICAL FIELD

Methods and compositions herein pertain to well treatment methods and fluids, such as those that include a synthetic polymer configured to increase viscosity of the fluid without crosslinking and to crosslink to increase viscosity of the fluid further.

BACKGROUND

Wells drilled in low-permeability subterranean formations are often treated by reservoir stimulation techniques, such as hydraulic fracturing, to increase their conductivity and thereby enhance recovery of hydrocarbons. Treatment fluids are pumped at high pressure into the formation to create fractures in the formation. Proppants may be incorporated in the treatment fluids to prop open the created fractures when the surface treating pressure is released. A wide variety of materials may be used for proppant, but it includes a solid material, often sand or ceramic particles.

In "hybrid" fracturing procedures, different fracturing fluids may be implemented to accomplish various stages of formation fracturing and proppant placement. A job may begin with a slickwater fracturing stage, or several slickwater stages, including a pad stage and early proppant stages. The pad stage fills the wellbore with the slickwater fracturing fluid. "Slickwater" refers to a treatment fluid with a comparatively low viscosity in the range of about 1 to less than about 5 centipoise (cP) at a shear rate of 511 seconds$^{-1}$ (sec$^{-1}$) and with a comparatively low concentration of proppant, such as less than or equal to about 3 pounds per thousand gallons (ppt), including the possibility of no proppant. Unless stated otherwise herein, viscosity values are for the materials at 20° Celsius (C). Despite the low viscosity, guar or derivatized guar without crosslinker may be present, but function as a friction reducer instead of a gellant material. In some hybrid jobs, one of the early stages may be left out.

Toward the middle of the job, during proppant stages, a linear gel fracturing fluid may be implemented for increased proppant transport and placement. "Linear gel" refers to a treatment fluid with an increased concentration of guar or derivatized guar without crosslinker to increase viscosity to the range of about 5 to less than about 50 cP at 511 sec$^{-1}$ and with greater than about 2 ppt of proppant. Later, a crosslinked gel fracturing fluid may be implemented for a still further increase in proppant transport and placement. "Cross-linked gel" refers to a treatment fluid with a crosslinker to increase viscosity to the range of about 50 cP and higher at 511 sec$^{-1}$, such as to about 2,000 cP, and with greater than about 3 ppt of proppant. The guar or derivatized guar may be crosslinked for such treatment fluid.

Research and development has included finding viable alternatives to guar-based polymers due to cost and availability. Accordingly, polymers suitable as guar replacements are desirable.

SUMMARY

A well treatment fluid includes a combination of ingredients that include an aqueous base, a non-associative, ionic, synthetic polymer, and optionally, at least one metal crosslinker. The synthetic polymer is configured to increase viscosity of the fluid without crosslinking and to crosslink using the metal crosslinker to increase viscosity of the fluid further. The synthetic polymer contains a backbone and a functional group that hinders hydrolysis of the backbone. The functional group is distributed at intervals on the backbone, designating first portions of the backbone where the functional group hinders hydrolysis and designating second portions of the backbone where the functional group does not substantially hinder hydrolysis.

A well treatment method includes forming a well treatment fluid by combining ingredients including a non-associative, ionic, synthetic polymer and a first aqueous base. The first fluid exhibits a first viscosity greater than a viscosity of the first aqueous base. The synthetic polymer contains a backbone and a functional group that hinders hydrolysis of the backbone. The functional group is distributed at intervals on the backbone, designating first portions of the backbone where the functional group hinders hydrolysis and designating second portions of the backbone where the functional group does not substantially hinder hydrolysis. The method includes treating a well during a stage using the first fluid exhibiting the first viscosity. A second well treatment fluid is formed by combining ingredients including the synthetic polymer, a second aqueous base, and at least one crosslinker and by crosslinking the synthetic polymer. The second fluid exhibits a second viscosity greater than a viscosity of the second aqueous base and greater than the first viscosity. The method includes treating the well during another stage different from the stage that uses the first fluid, the other stage using the second fluid exhibiting the second viscosity.

DETAILED DESCRIPTION

Even though guar is known for use as a polymer in slickwater fracturing stages, linear gel fracturing stages, and crosslinked gel fracturing stages, no synthetic polymers possessing the properties described herein are known for such a use both with and without crosslinking. By employing one synthetic polymer from the beginning to the end of a fracturing process including the various slickwater, linear gel, and crosslinked gel stages, costs may be reduced and efficiencies may be gained by sourcing a single synthetic polymer product.

Consequently, in an embodiment a well treatment fluid includes a combination of ingredients that include an aqueous base, a non-associative, ionic, synthetic polymer, and optionally, at least one metal crosslinker. The synthetic polymer is configured to increase viscosity of the fluid without crosslinking and to crosslink using the metal crosslinker to increase viscosity of the fluid further. The synthetic polymer contains a backbone and a functional group that hinders hydrolysis of the backbone. The functional group is distributed at intervals on the backbone, designating first portions of the backbone where the functional group hinders hydrolysis and designating second portions of the backbone where the functional group does not substantially hinder hydrolysis.

Exhibiting the characteristics described above, the synthetic polymer may be used in a slickwater hydraulic fracturing stage to reduce friction in the aqueous base and to reduce energy consumption while pumping large volumes of the well treatment fluid to open fractures in a well formation. Concentration of the synthetic polymer in slickwater may be from about 0.5 to less than about 5 pounds per thousand gallons (ppt).

An increased concentration of the synthetic polymer may increase viscosity of the well treatment fluid. As a result, the synthetic polymer may be used in a linear gel hydraulic fracturing stage to improve proppant transport and placement compared to a slickwater stage. Concentration of the synthetic polymer in linear gel may be at least about 5 ppt, such as from about 5 to about 25 ppt.

With the synthetic polymer configured to crosslink using a crosslinker to increase viscosity of the fluid, the same polymer may be used to form a crosslinked gel, facilitating an increased level of proppant transport and placement. The at least one crosslinker may be chosen from among metal crosslinker, borate crosslinker, etc. suitable for the selected polymer. Concentration of the synthetic polymer in crosslinked gel may be at least about 5 ppt, such as from about 5 to about 35 ppt.

In addition to the ingredients listed, another ingredient that may be used in slickwater includes an oxidative breaker to reduce formation damage from residual synthetic polymer. Another ingredient that may be used in linear gel includes an oxidative breaker. Ingredients that may be used in crosslinked gel include a buffering or pH adjusting agent, a crosslinking agent, and an oxidative breaker. Biocides, clay control agents, surfactants, corrosion inhibitors, non-emulsifiers, etc. may also be used in the fluids according to known practices.

An associative water-soluble polymer refers generally to polymers including a hydrophilic backbone with hydrophobic groups along the backbone or at the ends. The hydrophobic groups in associative polymers are capable of non-specific hydrophobic associations. Surfactants contain both a hydrophilic and a hydrophobic portion such that they form associations similar to those formed by associative polymers. With both hydrophilic and hydrophobic portions, associative polymers may form associations that generate viscosity within a fluid containing such a polymer.

In comparison, non-associative polymers lack hydrophobic groups and are not capable of generating viscosity modifying associations. As a result, non-associative polymers function on a different principle for viscosity modification compared to associative polymers. The associative structure that associative polymers create often relies on the addition of a surfactant. Also, the associative structure is often weaker and less temperature stable compared to the viscosity modification afforded by non-associative polymers. Additionally, known associative polymers are often not economically practical for use as friction reducers in slickwater.

The synthetic polymers used in the methods and compositions described herein may further be ionic, meaning either anionic or cationic. Ionicity of the polymer facilitates crosslinking of the polymer during crosslinked gel stages using a crosslinker, such as a metal crosslinker, borate crosslinker, etc. An additional benefit of a synthetic polymer includes the designed structure for the backbone and functional groups to designate portions of the backbone where functional groups may hinder hydrolysis or their absence may allow hydrolysis. For example, the synthetic polymer herein may exhibit hydrolysis of less than about 60 weight % (wt %).

Since hydrolysis contributes to the mechanism for crosslinking, some level of hydrolysis may be beneficial. By designating portions of the polymer for hydrolysis, locations for crosslinking can also be controlled to some extent. The control of crosslinking location may be relied on to yield a smooth gel instead of a lumpy gel in which crosslinking occurs unevenly at more random locations.

By way of example, the well treatment fluid may exhibit a pH of at least 3, such as at least 5. That is, the well treatment fluid may be configured for use in some process other than acid fracturing. The aqueous base may include freshwater, produced water, or brine. Among other polymers, suitable synthetic polymers include non-associative, anionic, synthetic copolymers or terpolymers of acrylamide. Additional synthetic polymers include non-associative, cationic, synthetic copolymers or terpolymers of acrylamide.

More specifically, an anionic copolymer of acrylamide and acrylamido tertbutyl sulfonic acid (ATBS) may be suitable. One suitable example includes DR9000LPP available from SNF Floerger, Inc. in Andrezieux, France. The tertbutyl sulfonic acid group may hinder hydrolysis of the backbone. The ratio of the acrylamide monomer to the ATBS monomer may be from about 1:20 to about 3:5. Without being limited to any particular theory, it is believed that the tertbutyl sulfonic acid group hinders hydrolysis, in a sense, by limiting access of acidic compounds to the amide/amine groups. "Limiting access" might not be technically correct in the sense of a steric type of chemical hindrance. Even so, protons from acidic compounds are believed to attach to the nitrogen-based groups and the tertbutyl sulfonic acid group appears to limit such interaction. Other hindrance mechanisms, especially for different functional groups, are conceivable. Possible metal crosslinkers include titanium, aluminum, and zirconium. The crosslinked gel may be foamed or energized with nitrogen, carbon dioxide, or air.

With an understanding of the capabilities of the well treatment fluids described herein, a well treatment method in an embodiment includes forming a well treatment fluid by combining ingredients including a non-associative, ionic, synthetic polymer and a first aqueous base. The first fluid exhibits a first viscosity greater than a viscosity of the first aqueous base. The synthetic polymer contains a backbone and a functional group that hinders hydrolysis of the backbone. The functional group is distributed at intervals on the backbone, designating first portions of the backbone where the functional group hinders hydrolysis and designating second portions of the backbone where the functional group does not substantially hinder hydrolysis. The method includes treating a well during a stage using the first fluid exhibiting the first viscosity.

A second well treatment fluid is formed by combining ingredients including the synthetic polymer, a second aqueous base, and at least one crosslinker and by crosslinking the synthetic polymer. The second fluid exhibits a second viscosity greater than a viscosity of the second aqueous base and greater than the first viscosity. The method includes treating the well during another stage different from the stage that uses the first fluid, the other stage using the second fluid exhibiting the second viscosity.

By way of example, the synthetic polymer compositions and properties described above may be used for the present well treatment method. The synthetic polymer may exhibit thermal stability for at least 3 hours at 325° F. or less. As the term is used herein, "thermal stability" refers to maintaining the chemical structure of a material as evidenced by maintaining its physical properties. Maintaining viscosity of the well treatment fluid evidences thermal stability of the synthetic polymer. However, it is conceivable that a thermally stable synthetic polymer may experience viscosity loss as a result of other factors.

The first aqueous base may include freshwater, produced water, or brine and the second aqueous base may independently include freshwater, produced water, or brine. Accordingly, the first aqueous base may be different from the second aqueous base. The first fluid may exhibit a pH of at least 5 and the second fluid may independently exhibit a pH of at least 5. Indeed, the first fluid and the second fluid may exhibit different pH values.

The stage that uses the first fluid discussed above may include slickwater hydraulic fracturing or linear gel hydraulic fracturing. The other stage, which includes crosslinking, may occur after the stage that uses the first fluid. The method may further include forming a third well treatment fluid by combining ingredients including the synthetic polymer and a third aqueous base. A concentration of the synthetic polymer in the third fluid may be less than a concentration of the synthetic polymer in the first fluid. The third fluid may exhibit a third viscosity greater than a viscosity of the third aqueous base and less than the first viscosity. Accordingly, the method may include treating the well during a further stage different from the other stage and the stage that uses the first fluid, the further stage using the third fluid exhibiting the third viscosity.

Features of the various well treatment fluids and well treatment methods described above may be selected and combined to produce a further variety of well treatment methods and fluids. Accordingly, the further stage may be the initial stage and occur as slickwater hydraulic fracturing. The stage that uses the first fluid may be the next in order and occur as linear gel hydraulic fracturing. The other stage may be the next in order and occur as crosslinked gel hydraulic fracturing. Other orders for the stages are conceivable even though the stated order follows a known order for hybrid fracturing jobs.

The polymer may be delivered as an emulsion or as a dry powder as done in known methods for forming well treatment fluids. Versatility of the synthetic polymer in various stages of a hydraulic fracturing process allows for efficiencies since a single synthetic polymer may be used for stages of different types. Although copolymers are described herein, terpolymers are conceivable as well. Titanium, aluminum, and zirconium crosslinkers may be used as the metal crosslinker.

Although synthetic polymer, such as a copolymer of acrylamide and ATBS, is known for use in slickwater fracturing applications, development of a crosslinked system extends use of the synthetic polymer into additional types of well treatment. By using one synthetic polymer from the beginning to the end, costs can be reduced and efficiencies can be gained by sourcing only one product.

In a further embodiment, a well treatment method includes forming a first well treatment fluid exhibiting a pH of at least 3 by combining ingredients including a non-associative, ionic, synthetic polymer and a first aqueous base. The first fluid exhibits a first viscosity greater than a viscosity of the first aqueous base. The synthetic polymer contains a backbone and a functional group that hinders hydrolysis of the backbone. The functional group is distributed at intervals on the backbone, designating first portions of the backbone where the functional group hinders hydrolysis and designating second portions of the backbone where the functional group does not substantially hinder hydrolysis. The method includes treating a well during a stage using the first fluid exhibiting the first viscosity.

A second well treatment fluid is formed exhibiting a pH of at least 3 by combining ingredients including the synthetic polymer, a second aqueous base, and at least one crosslinker and crosslinking the synthetic polymer. The second fluid exhibits a second viscosity greater than a viscosity of the second aqueous base and greater than the first viscosity. The method includes treating the well during another stage after the stage that uses the first fluid, the other stage using the second fluid exhibiting the second viscosity.

A third well treatment fluid is formed exhibiting a pH of at least 3 by combining ingredients including the synthetic polymer and a third aqueous base. A concentration of the synthetic polymer in the third fluid is less than a concentration of the synthetic polymer in the first fluid. The third fluid exhibits a third viscosity greater than a viscosity of the third aqueous base and less than the first viscosity. The method includes treating the well during a further stage before the stage that uses the first fluid, the further stage using the third fluid exhibiting the third viscosity.

By way of example, the further stage may include slickwater hydraulic fracturing and the stage that uses the first fluid may include linear gel hydraulic fracturing. The synthetic polymer may include a non-associative, anionic, synthetic copolymer of acrylamide and 2-acrylamido-terbutyl sulfonic acid or a non-associative, cationic, synthetic copolymer of acrylamide. Features of the various well treatment fluids and well treatment methods described above may be selected and combined to produce a further variety of well treatment methods and fluids.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A well treatment method comprising:

forming a first well treatment fluid exhibiting a pH of at least 5 by combining ingredients excluding any non-associative, anionic, synthetic terpolymer and including a non-associative, anionic, synthetic copolymer of acrylamide and 2-acrylamido-tertbutyl sulfonic acid and a first aqueous base, the first fluid exhibiting a first viscosity without crosslinking greater than a viscosity of the first aqueous base, the synthetic copolymer exhibiting thermal stability for at least 3 hours at 325° F., containing a backbone and a functional group that hinders hydrolysis of the backbone, and the functional group being distributed at intervals on the backbone, designating first portions of the backbone where the functional group hinders hydrolysis, and designating second portions of the backbone where the functional group does not substantially hinder hydrolysis;

treating a well during a stage using the first fluid exhibiting the first viscosity;

forming a second well treatment fluid exhibiting a pH of at least 5 independent of the first fluid pH by combining ingredients excluding any non-associative, anionic, synthetic terpolymer and including the synthetic copolymer, a second aqueous base, and at least one crosslinker and by crosslinking the synthetic copolymer, the second fluid exhibiting a second viscosity greater than a viscosity of the second aqueous base and greater than the first viscosity; and treating the well during another stage different from the stage that uses the first fluid, the other stage using the second fluid exhibiting the second viscosity.

2. The method of claim 1 wherein the first aqueous base comprises fresh water, produced water, or brine and the second aqueous base independently comprises fresh water, produced water, or brine.

3. The method of claim 1 wherein the first fluid and the second fluid exhibit different pH values.

4. The method of claim 1 wherein the stage that uses the first fluid comprises slickwater hydraulic fracturing or linear gel hydraulic fracturing.

5. The method of claim 4 wherein the first fluid exhibits a viscosity of about 1 to less than about 5 centipoise (cP) at a shear rate of 511 seconds$^{-1}$ (sec$^{-1}$) in the slickwater hydraulic fracturing or the first fluid exhibits a viscosity of about 5 to less than about 50 cP at 511 sec$^{-1}$ in the linear gel hydraulic fracturing.

6. The method of claim 1 wherein the other stage occurs after the stage that uses the first fluid.

7. The method of claim 1 further comprising:
forming a third well treatment fluid by combining ingredients including the synthetic copolymer and a third aqueous base, a concentration of the synthetic copolymer in the third fluid being less than a concentration of the synthetic copolymer in the first fluid, and the third fluid exhibiting a third viscosity greater than a viscosity of the third aqueous base and less than the first viscosity; and
treating the well during a further stage different from the other stage and the stage that uses the first fluid, the further stage using the third fluid exhibiting the third viscosity.

8. The method of claim 7 wherein the further stage comprises slickwater hydraulic fracturing and the stage that uses the first fluid comprises linear gel hydraulic fracturing.

9. The method of claim 8 wherein:
the third fluid exhibits a viscosity of about 1 to less than about 5 centipoise (cP) at a shear rate of 511 seconds$^{-1}$ (sec$^{-1}$) in the slickwater hydraulic fracturing; and
the first fluid exhibits a viscosity of about 5 to less than about 50 cP at 511 sec$^{-1}$ in the linear gel hydraulic fracturing.

10. The method of claim 1 wherein the synthetic copolymer has a ratio of the acrylamide to the 2-acrylamido-tertbutyl sulfonic acid of from about 1:20 to about 3:5.

11. The method of claim 1 wherein the synthetic polymer exhibits hydrolysis of less than about 60 weight % (wt %) in the first and second fluids by virtue of the first portions of the backbone that hinder hydrolysis.

12. A well treatment method comprising:
forming a first well treatment fluid exhibiting a pH of at least 5 by combining ingredients excluding any non-associative, anionic, synthetic terpolymer and including a non-associative, anionic, synthetic copolymer of acrylamide and 2-acrylamido-tertbutyl sulfonic acid and a first aqueous base, the first fluid exhibiting a first viscosity greater than a viscosity of the first aqueous base, the synthetic copolymer exhibiting thermal stability for at least 3 hours at 325° F., containing a backbone and a functional group that hinders hydrolysis of the backbone, and the functional group being distributed at intervals on the backbone, designating first portions of the backbone where the functional group hinders hydrolysis, and designating second portions of the backbone where the functional group does not substantially hinder hydrolysis;
treating a well during a stage using the first fluid exhibiting the first viscosity;
forming a second well treatment fluid exhibiting a pH of at least 5 by combining ingredients excluding any non-associative, anionic, synthetic terpolymer and including the synthetic copolymer, a second aqueous base, and at least one crosslinker and crosslinking the synthetic copolymer, the second fluid exhibiting a second viscosity greater than a viscosity of the second aqueous base and greater than the first viscosity;
treating the well during another stage after the stage that uses the first fluid, the other stage using the second fluid exhibiting the second viscosity;
forming a third well treatment fluid exhibiting a pH of at least 5 by combining ingredients excluding any non-associative, anionic, synthetic terpolymer and including the synthetic copolymer and a third aqueous base, a concentration of the synthetic copolymer in the third fluid being less than a concentration of the synthetic copolymer in the first fluid, and the third fluid exhibiting a third viscosity without crosslinking greater than a viscosity of the third aqueous base and less than the first viscosity; and
treating the well during a further stage before the stage that uses the first fluid, the further stage using the third fluid exhibiting the third viscosity.

13. The method of claim 12 wherein the further stage comprises slickwater hydraulic fracturing and the stage that uses the first fluid comprises linear gel hydraulic fracturing.

14. The method of claim 13 wherein an increased concentration of the synthetic copolymer increases viscosity of the first, second, and third fluids, the third fluid contains from about 0.5 to less than about 5 pounds per thousand gallons (ppt) of the synthetic polymer, and the first fluid contains at least about 5 ppt of the synthetic polymer.

15. The method of claim 14 wherein:
the third fluid exhibits a viscosity of about 1 to less than about 5 centipoise (cP) at a shear rate of 511 seconds$^{-1}$ (sec$^{-1}$) in the slickwater hydraulic fracturing;
the first fluid exhibits a viscosity of about 5 to less than about 50 cP at 511 sec$^{-1}$ in the linear gel hydraulic fracturing; and
the second fluid exhibits a viscosity of about 50 cP and higher at 511 sec$^{-1}$ during a crosslinked gel stage.

16. The method of claim 12 wherein the crosslinker comprises a metal crosslinker.

17. The method of claim 12 wherein the aqueous base comprises fresh water, produced water, or brine.

18. The method of claim 12 wherein the first fluid and the second fluid exhibit different pH values.

19. The method of claim 12 wherein the synthetic copolymer has a ratio of the acrylamide to the 2-acrylamido-tertbutyl sulfonic acid of from about 1:20 to about 3:5.

20. A well treatment method comprising:
forming a first well treatment fluid exhibiting a pH of at least 5 by combining ingredients excluding any non-associative, anionic, synthetic terpolymer and including an aqueous base and a non-associative, anionic, synthetic copolymer of acrylamide and 2-acrylamido-tertbutyl sulfonic acid with a ratio of the acrylamide to the 2-acrylamido-tertbutyl sulfonic acid of from about 1:20 to about 3:5, the first fluid exhibiting a first viscosity of about 5 to less than about 50 centipoise (cP) at 511 seconds$^{-1}$ (sec$^{-1}$) that is greater than a viscosity of the aqueous base, the synthetic copolymer exhibiting thermal stability for at least 3 hours at 325° F., containing a backbone and a functional group that hinders hydrolysis of the backbone, and the functional group being distributed at intervals on the backbone, designating first portions of the backbone where the functional group hinders hydrolysis, and designating second portions of the backbone where the functional group does not substantially hinder hydrolysis;

treating a well during a stage using the first fluid exhibiting the first viscosity;

forming a second well treatment fluid exhibiting a pH of at least 5 by combining ingredients excluding any non-associative, anionic, synthetic terpolymer and including the synthetic copolymer, the aqueous base, and at least one crosslinker and crosslinking the synthetic copolymer, the second fluid exhibiting a second viscosity of about 50 cP and higher at 511 sec$^{-1}$ that is greater than a viscosity of the aqueous base and greater than the first viscosity;

treating the well during another stage after the stage that uses the first fluid, the other stage using the second fluid exhibiting the second viscosity;

forming a third well treatment fluid exhibiting a pH of at least 5 by combining ingredients excluding any non-associative, anionic, synthetic terpolymer and including the synthetic copolymer and the aqueous base, a concentration of the synthetic copolymer in the third fluid being from about 0.5 to less than about 5 pounds per thousand gallons (ppt) that is less than a concentration of the synthetic copolymer in the first fluid of at least about 5 ppt, and the third fluid exhibiting a third viscosity without crosslinking of about 1 to less than about 5 cP at a shear rate of 511 sec$^{-1}$ that is greater than a viscosity of the aqueous base and less than the first viscosity; and treating the well during a further stage before the stage that uses the first fluid, the further stage using the third fluid exhibiting the third viscosity and the synthetic polymer exhibiting hydrolysis of less than about 60 weight % (wt %) in the first, second, and third fluids by virtue of the first portions of the backbone that hinder hydrolysis.

* * * * *